United States Patent [19]

Huddleston, Jr. et al.

[11] Patent Number: 4,671,860
[45] Date of Patent: Jun. 9, 1987

[54] LOW ENERGY DEWATERING OF DISPERSED PARTICLE LATEXES BY ELECTROFILTRATION

[75] Inventors: George R. Huddleston, Jr., Lorain; Walter A. Edwards, North Ridgeville, both of Ohio

[73] Assignee: The B. F. Goodrich Company, Akron, Ohio

[21] Appl. No.: 802,929

[22] Filed: Nov. 29, 1985

[51] Int. Cl.$^4$ ............................................. B01D 13/02
[52] U.S. Cl. ............................... 204/182.3; 204/180.1; 204/180.9; 204/299 R; 204/300 R; 204/301; 210/748
[58] Field of Search ............... 204/182.3, 180.9, 180.1, 204/301, 299 R, 300 R; 210/748

[56] References Cited

U.S. PATENT DOCUMENTS

| | | | |
|---|---|---|---|
| 3,664,940 | 5/1972 | Greyson et al. | 204/182.3 |
| 3,901,842 | 8/1975 | Dembrowski | 260/29.6 |
| 4,107,026 | 8/1978 | Freeman | 204/180.1 |
| 4,134,820 | 1/1979 | Ellis et al. | 204/300 |
| 4,170,529 | 10/1979 | Freeman | 204/182.3 |
| 4,207,158 | 6/1980 | Freeman | 204/180 |
| 4,246,039 | 1/1981 | Mixon, Jr. | 106/288 |
| 4,292,424 | 9/1981 | Huddleston | 528/500 |
| 4,331,525 | 5/1982 | Huba et al. | 204/180.1 |
| 4,549,947 | 10/1985 | Inoue et al. | 204/301 |
| 4,561,953 | 12/1985 | Muralidhart et al. | 204/182.3 |
| 4,569,739 | 2/1986 | Klinkowski | 204/180.1 |
| 4,619,747 | 10/1986 | Hoadley et al. | 204/182.3 |

FOREIGN PATENT DOCUMENTS 0028837  5/1981  Eurpean Pat. Off. .

Primary Examiner—Arthur P. Demers
Attorney, Agent, or Firm—Daniel J. Hudak; Joe A. Powell

[57] ABSTRACT

A process for the removal of water from dispersed particles such as vinyl resins uses electrofiltration to yield a high total solids content wetcake. A final dryer such as a fluid energy dryer is used to yield a dry, finely divided resin or polymer. Accordingly, the need for various spray drying methods accompanied by subsequent harsh grinding steps are eliminated. Substantial energy cost savings are realized and the need for coagulation additives are eliminated as well as the necessary removal and neutralization of undesirable residues.

10 Claims, 1 Drawing Figure

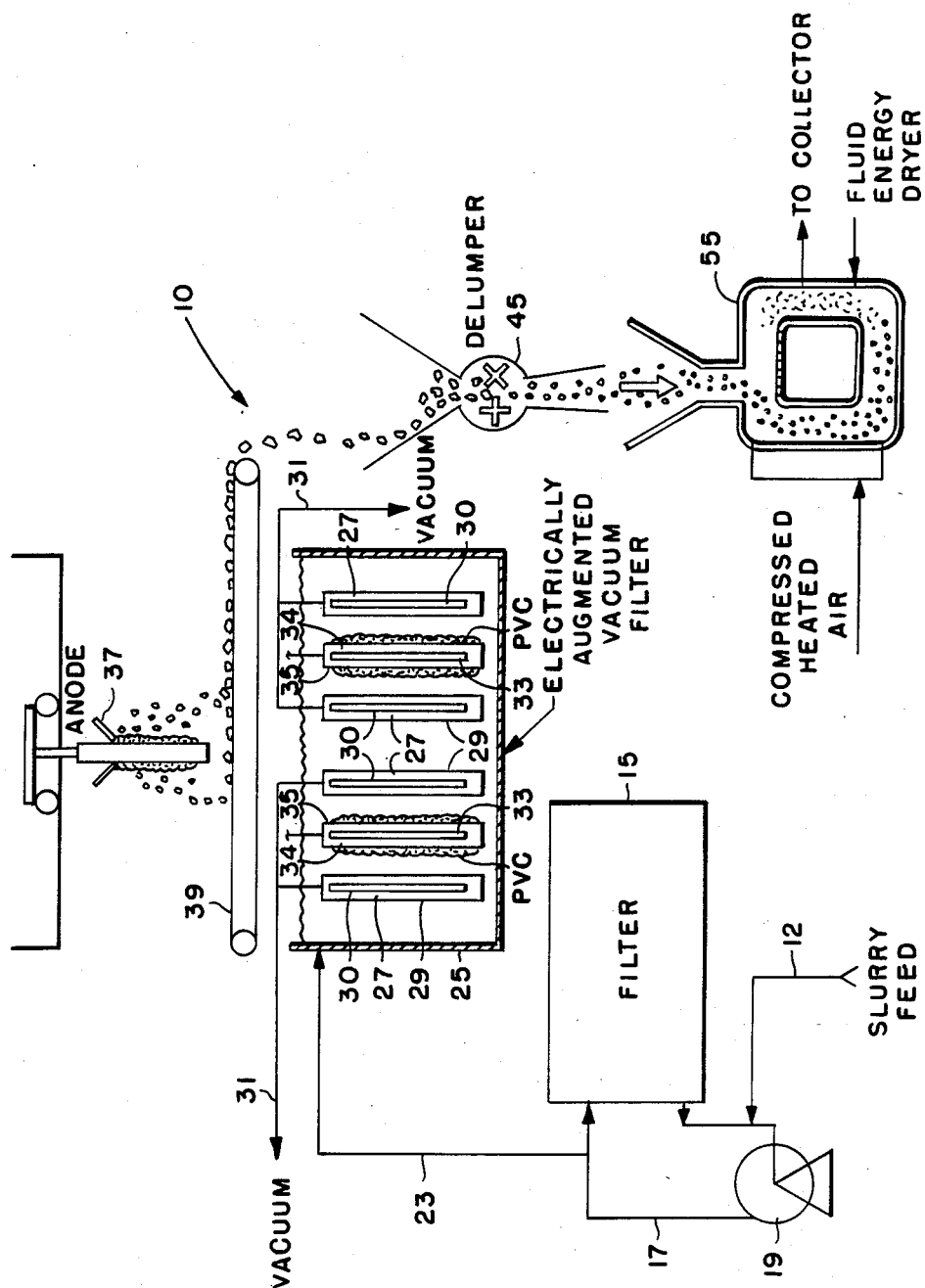

LOW ENERGY DEWATERING OF DISPERSED PARTICLE LATEXES BY ELECTROFILTRATION

BACKGROUND

Dispersed particles such as vinyl plastisol resins desirably have a high plasticizer capacity, an increased flexibility, workability, and distensibility. Usually, these resins are made by an emulsion polymerization process in which relatively large quantities of emulsifiers or soaps are utilized. In emulsion polymerization, the finished product is a polymer latex, which, theoretically, can be coagulated, filtered to remove the polymer particles and then dried. However, it is difficult to conduct such a process without forming agglomerates of polymer which cannot be disintegrated without using harsh grinding procedures which often adversely affect the quality of the polymer. If the resin is used as is, the agglomerates are excessively large and detract from the usefulness of the resin when vinyl resin plastisols are subsequently made. The use of coagulation aids is also necessary and often imparts undesirable properties to the resin. As a result, it has been the common practice in the industry to take the polymer latex having polymer particles of the proper predetermined size and spray-dry the latex. However, a drawback of this procedure is that all of the emulsifier or soap, initially added to the polymerization mixture, is deposited on the polymer particles. Various properties of products made from the particles can be affected, for example, clarity and gloss. Also, the large amount of soap present can adversely affect the viscosity of a plastisol. The color of the final product may be affected by the soap since the same may discolor at processing temperatures. An additional drawback of the spray drying method is that large amounts of energy are required to remove the water by evaporation.

While many attempts have been made to remove the soap from vinyl dispersion resins by simple washing, most have run into various kinds of technical problems. Also, the various proposals have been expensive and complicated. As a result, little has been done to remove the soap after the spray-drying operation.

U.S. Pat. No. 3,901,842 relates to coagulation of a vinyl polymer latex, centrifuging the same to form a polymer wetcake and then redispersing the wetcake by use of a redispersant such as a polyacrylate. Thereafter the redispersed wetcake is dried in a spray-dryer.

U.S. Pat. No. 4,292,424 to Huddleston et al relates to the production of vinyl dispersion resins by means of emulsion polymerization and the recovery of the resins by a process which includes coagulating the latex to form a filtering sludge, passing the sludge to a pressure filter to separate the high solids, forming a friable wetcake, rinsing the wetcake with proper agents to neutralize the same and removing undesirable residues. Pressure in the filter is applied to the rinsed wetcake to increase the solids content thereof. The wetcake is then broken into particles and dried and ground to a proper size in one step in a fluid energy mill.

U.S. Pat. No. 4,207,158 relates to a process for dewatering a suspension of solids utilizing an electrically augmented vacuum filtration apparatus.

U.S. Pat. No. 4,331,525 relates to a process and apparatus for the recovery of suspended solids from a liquid medium. The liquid medium containing suspended solids is circulated through an electrolytic cell and an ultrafiltration unit, the suspended solids being removed from the liquid medium as a uniform particulate mass of low liquid content while a proportionate amount of the liquid and dissolved components such as surfactants is removed through ultrafiltration to avoid a dilution of the liquid medium.

European Patent Application No. 0,028,837 relates to a processing apparatus for recovering suspended solids from a liquid medium. An electrolytic cell as well as an ultrafiltration unit is utilized.

U.S. Pat. No. 4,134,820 relates to an apparatus for removing a wetcake from an anode in an electrofiltration process.

U.S. Pat. No. 4,107,026 relates to a method and apparatus for dewatering suspended matter and includes the use of vacuum filtration.

U.S. Pat. No. 4,246,039 is similar to U.S. Pat. No. 4,107,026 and also relates to the use of electrofilitration.

SUMMARY OF THE INVENTION

Dispersed particles such as vinyl polymer latexes having desirable properties and producing suitable plastisols can be made by a process utilizing an electrofiltration unit therein and a non-slurry type dryer. Energy consumption is also reduced as compared to a spray drier process.

In general, a method of removing water from a dispersed particle slurry, comprising the steps of:
adding the slurry to an electrofilter; and
removing a portion of the water from said slurry to partially dry said slurry and form a wetcake.

BRIEF DESCRIPTION OF THE DRAWING

The drawing is a schematic diagram of a dewatering process according to the present invention.

DETAILED DESCRIPTION

According to the concepts of the present invention, a dispersed particle slurry containing from about 5% to about 65% by weight of total solids is added to an electrofilter wherein a portion of the water is removed. A wetcake is formed which is subjected to a final drier wherein substantially all the remaining water is removed.

The dispersed particles of the present invention include various polymers such as rubbers prepared by emulsion polymerization, e.g., polybutadiene, styrene-butadiene rubber, polystyrene, butadiene-acrylonitrile rubbers, neoprene; other types of polymers such as polyvinyl chloride; copolymers of vinyl chloride; fluorocarbon polymers; styrene-methyl methacrylate; polyethylacrylate; and polyisoprene. Desirably, the various dispersed particle latexes the present invention are vinyl resins. That is, they are polymers or copolymers of vinyl and vinylidene halides, such as vinyl chloride, vinylidene chloride, and the like. The vinyl halides and vinylidene halides can be copolymerized with each other or copolymerized with one or more unsaturated polymerizable olefinic monomers. Examples of such unsaturated olefinic monomers include alpha-beta-olefinically unsaturated carboxylic acids, such as acrylic acid, methacrylic acid, ethacrylic acid, alpha-cyanoacrylic acid, and the like; esters of acrylic acid, such as methyl acrylate, ethylacrylate, butyl acrylates, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl esters, such as ethylvinyl ether, chloroethyl vinyl ether, and the like; the vinyl ketones; styrene and styrene derivatives including vinyl toluene, chlorostyrene, and the like; vinyl naphthalene, allyl and vinyl chloroacetate, vinyl acetate, vinyl pyridine, methyl vinyl ketone, and other polymerizable olefinic monomers of the types known to those skilled in the art and to the literature.

The vinyl dispersed particles are made by emulsion polymerization of vinyl chloride or vinylidene chloride, either alone or in admixture with one or more olefinic monomers copolymerizable therewith in amounts as great as about 80% by weight based on the total weight of the monomer mixture. The most preferred vinyl dispersion resin is polyvinyl chloride (PVC) and the present invention, for simplicity and convenience, will be described in connection therewith, it being understood that this is merely intended in an illustrative sense and not a limitation.

The preparation of dispersed particles via emulsion polymerization techniques are known to the art as well as to the literature. Accordingly, various conventional free radical yielding catalyst or initiators can be utilized, various conventional emulsifiers or emulsifier systems, the optional use of long straight chain saturated alcohols containing from about 8 to 24 carbon atoms, suitable temperature and pH ranges, and the like, all as set forth in U.S. Pat. No. 4,292,424 which is hereby fully incorporated by reference with regard to the same.

According to the present invention, the dispersed particles such as vinyl resins in the form of a slurry are fed to a dewatering process to remove the water and substantially dry the resin. The process contains an optional prefilter, an electrofilter, and a final dryer such as a fluid energy dryer, and the like.

A particular embodiment of the present invention is schematically shown in FIG. 1 wherein the overall process is generally represented by the numeral 10. The vinyl dispersion resin slurry feed 12 is fed to an optional prefilter 15. The prefilter can be any conventional filter known to the art and to the literature which removes a portion of the water from the vinyl slurry and accordingly increases the amount of total solids therein. One suitable type of prefilter is an ultrafilter which contains a semipermeable membrane and operates at low pressures. That is, pressure on the order of from about 10 to about 60 psig and desirably from about 20 to about 50 is utilized to force dissolved salt, water, and other liquid components from the vinyl resin slurry. An example of a suitable semipermeable membrane is Abcor HM 100, manufactured by Koch Membrane Systems, Wilmington, Mass.

In order to improve the efficiency of the prefilter, the vinyl resin slurry is recycled as through recycle line 17 with aid of conventional pump 19. Generally, the total solids by weight of the vinyl resin electrofiltered feed slurry is not important and can be from about 5% to about 65% by weight, desirably from about 30% to about 60%, with from about 45% to about 55% being preferred. This latter range is desirable for the most efficient operation of electrofilter 25 but is not necessary.

The partially dewatered vinyl resin slurry from prefilter 15 is fed to the electrofilter via line 23. More specifically, electrofilter 25 is desirably an electrically augmented vacuum filter (EAVF) used to generate a relatively dry wetcake of vinyl resin, as for example from about 65% to about 95% total solids and desirably from about 80 to about 85% total solids by weight although the solids amount can be higher or lower. The EAVF contains cathode electrodes 27 which are surrounded by a framework or a lattice generally made of plastic. A filter cloth 29, such as is applied thereover and sealed to form a cathode cell. Additionally, a vacuum line 31 is applied to the sealed lattice electrode to essentially create a vacuum filter. As shown in the drawing, such a vacuum filter exists in association with each anode 33 in the tank or electrolitic bath containing the dispersed particle or resin slurry. Accordingly, upon the application of a vacuum to the cathode cell, water as well as water soluble components such as emulsifiers, soaps, salts, etc., are filtered out through the filter cloth. The removal of the various water soluble components is an important aspect of the present invention in that when dried, the vinyl resin contains substantially lower amounts of such components. Inasmuch as such particles contain less surfactant thereon, that is an emulsifier, a soap, etc., various physical properties are affected and generally improved such as clarity, color, gloss, and viscosity. By the term "substantially lower" it is meant that generally at least 15%, desirably at least 30% and preferably at least 50% of the original water soluble components thereon are removed.

Since the particle size of the dispersed particles such as PVC resin would plug the filter pores of any cathode filter quite rapidly, the system is electrified to abate such a problem. Thus, an electrode, that is a cathode 30 is installed inside each vacuum filter and anode 33 is placed between them. The anode thus serves as a positive pole. Upon the application of a direct current power source, not shown, an electric field is established. The phenomena of electrophoresis causes the vinyl resin particles to move toward the anode and away from the cathode presumably though not necessarily because of the negative charge on the dispersed particles such as vinyl resin due to the surfactant thereon. Since the vinyl resin particles move away from the cathode, effective filtration of water through filter cloth 29 is achieved. Naturally, the vinyl resin particles are desposited on anode 33 and form a cake. Since electrophoresis causes all sizes of particles to move at the same rate, a cake is produced of the same particle size distribution as in the slurry. Inasmuch as the vinyl resin particles tend to be corrosive and degrade metal anode 33, a filter cloth 35 which can be made from cotton, polyester, polypropylene, etc., as supported by porous plastic lattices 34 is located around the anode in a manner similar to the vacuum filter electrode. Desirably, the anode filter cloth is coated with a conventional membrane which has low water permeability. Moreover, the anode filter must be filled with a circulating electrolytic which shall be called an anolyte.

Generally, the anolyte is any electrolytic solution which imparts the necessary conductivity to the water. Examples of suitable electrolytes include sodium bicarbonate, ammonium carbonate, sodium acetate, sodium formate, sodium laurate, sodium borate, cadmium nitrate, sodium oxtyl sulfate, mangesium lauryl sulfate, sodium methyl sulfate, alpha olefin sulfonate, and the like. Examples of such compounds as well as additional electrolytes are set forth in an application filed herewith, now U.S. patent application Ser. No. 802,930, for "Property Variation of Dispersion Resins by Electrofiltration", which is hereby fully incorporated by reference with regard to the type, variety and utilization of such electrolytes.

More specifically, the anode electrolyte compounds are soluble in a solvent, usually water, and are organic or inorganic salts. Considering the organic salts, the cation portion is generally an alkali or an alkali earth such as lithium, sodium, magnesium, potassium, calcium, and the like. Additionally, various transition metals can be utilized such as cadmium, zinc, copper, and the like. An anion portion of the organic salt is generally an organic ester such as an organic sulfate, sulfonate, nitrate, phosphate, and the like having from about 2 to about 20 carbon atoms, and desirably from about 10 to about 18 carbon atoms. The organic derivatives of the anions can also be polyethers containing up to 30 carbon atoms. The aliphatic derivative can be alkyl or alkenyl. Often the organic anode electrolyte is a surfactant such as a detergent or emulsifier. Examples of such suitable surfactants are set forth in the various annual editions of *McCutcheon's Detergents and Emulsifiers*, North American Edition, International Edition, Functional Materials, 1979, as well as preceding and subsequent years, which text is hereby fully incorporated by reference.

Considering the inorganic electrolytes, the cation portion is also generally an alkali or alkali earth such as sodium, potassium, calcium, magnesium, and the like. Other cations can also be utilized such as ammonium, quaternary amines, and the like. The anionic portion is usually a complex such as carbonate, a nitrate, a borate, a sulfate, a sulfonate, phosphate, polyphosphate, silicates, aluminates, and the like. Specific examples of such anode electrolytes have been set forth above in Table 1 with regard to their viscosity-modifying properties of vinyl plastisols. Naturally, many other electrolytes can be utilized in accordance with the present invention and their property modifying effects readily determined.

It is furthermore noted that the type of electrolyte utilized as the catholyte can be used as the anolyte. That is, the catholyte solution can be utilized as the anolyte by transferring it to the anode cell. However, it may be desirable to increase the conductivity of such transferred solution. However, chloride compounds or other compounds which decompose and produce toxic gases are avoided.

Electrical current is carried from the anode through the anolyte, the anode membrane, the cake, the bath slurry, the cathode filter, the filtrate (catholyte), to the cathode. It is important that the anolyte have a conductivity of desirably at least 5,000 micromhos/cm, and more desirably at least 30,000 micromhos/cm to form an effective electrolytic anolyte solution. Not only does the anolyte protect the anode, but it can also be recirculated and cooled to remove heat generated before being recycled to the anode filter cell. A catholyte within the vacuum filter or cell is formed and usually contains a hydroxide electrolyte. The conductivity of the catholyte is not critical and may vary widely as from as low as 600 up to about 10,000 micromhos/cm.

The vinyl resin cake formed on the anode cell can be removed by any number of methods. One such method is schematically shown in FIG. 1 wherein the anode is simply raised out of the electrofilter and passed through a pair of doctoring blades 37 with the vinyl resin being collected on a suitable carrier such as conveyor belt 39. The mudcake resin is relatively dry and friable and is thus easily handled. A specific example of a suitable electrofilter 25 is a Dorr-Oliver L12. With regard to further details of the electrofilter, reference is hereby made to U.S. Pat. No. 4,207,158 which is hereby fully incorporated by reference with regard to its teachings, instruction, operation and preparation of such a filter. Moreover, it is noted that according to the present invention, generally any electrofilter known to the art as well as to the literature can be utilized. However, desirably it contains an anolyte and a cathode vacuum cell.

Before being subjected to further drying, the vinyl resin wetcake can optionally be broken down to finer sized particles or granulated by any conventional apparatus such as delumper 45. An example of a suitable delumper is KEK model Major MD Centrifugal Sifter, manufactured by KEK Corporation, Bristol, Pa.

The vinyl resin particles are then fed to final dryer 55 which substantially removes all remaining water. The dryer is often referred to as a final dryer in that the vinyl resin particles are sufficiently dried and no subsequent drying steps are required. Although the final dryer is usually a single dryer apparatus, multiple dryers can be utilized to effect substantial removal of the water. Generally, any conventional mechanical dryer known to the art as well as to the literature can be utilized. Examples of such mechanical dryers include a rotary dryer, a venturi dryer, a fluidized bed dryer, a conveyor dryer, and the like. A limitation of such dryers is that lumps are still retained or generated and hence must be ground. The mechanical dryers also tend to apply extra heat and develop a heat history within the vinyl resin. This results in the resin having reduced stability. Mechanical dryers also tend to form gels which are a limiting factor in the application of very thin films. Moreover, the mechanical dryers tend to alter the size and shape of the particles and thus affect flow properties.

Another type of dryer which can be utilized is a conventional spray dryer. However, the wetcake from the electrofilter has to be re-slurried and then fed to the spray dryer which can handle up to approximately a maximum of 60% solids by weight.

The most desirable final drying method or apparatus is one which can handle high solids crumbly polymer particles and produce finely dried ground resins or polymers. A suitable class of such drying apparatus are the fluid energy dryers, that is dryers in which the vinyl resin particles are generally always suspended in air or a gas. Moreover, the air or gas is generally highly turbulent. These dryers are generally in the form of a mill which is vertically structured and has an elongated torus therein which functions as a circulating cavity. The mill has two functional areas. The first is a fluid grinding area located at either the side or the base of the mill or torus and is positioned adjacent to a pressurized manifold. The second area is a classifying or polymer recovering area located in the upper section of the mill. The friable vinyl resin particles generally in the form of small agglomerates are fed to the lower section of the fluid energy mill or the fluid grinding area. This portion of the mill is highly turbulent since it is in this region that hot gas under pressure is injected by hot gas jets. The temperature of the injected gas. e.g. air can be from about 60° C. to about 260° C. depending upon the polymer being dried. Typically, temperatures in the range of from about 80° C. to about 175° C. The outlet air temperature from the fluid energy mill will generally be in the range of from about 35° C. to about 100° C. with from about 45° C. to about 55° C. being preferred. Naturally, the outlet air temperature can be maintained at a desired value to maintain a proper drying temperature within the mill. The pressure of the air injected into the mill is generally from about 2.5 psig to about 80 psig and preferably from about 2.5 psig to about 7.5 psig. In order for the pressure to be changed, the manifold jets are changed to either increase or decrease the pressure. Inasmuch as the flow of air or gas through the fluid energy dryer tends to be constant, higher pressures inject air at a higher speed and hence increase the initial turbulance. Often, it is desirable not to utilize high temperatures for prolonged periods due to the likelihood of imparting undesirable properties to the vinyl resin such as discoloration and the like. When the wetcake particles encounter the hot air, water vaporization instantly cools the air such that the particles are generally not exposed to higher temperatures when in the dry state. During operation of the dryer, the outlet temperature is controlled within a desirable range and the inlet temperature is automatically adjusted to compensate for the amount of water in the vinyl resin wetcake feed.

The injected hot air which is heated in any manner as by direct fire heaters, causes the vinyl resin particles to circulate around the cavity of the dryer. Due to the existence of high turbulance, good heat transfer is achieved. Moreover, the high turbulance causes the particles to collide with each other or the walls of the mill and hence cause the friable vinyl resin agglomerates to breakup into individual polymer particles. Through control of the outlet temperature and inlet temperature, vaporization of substantially all of the water in the vinyl resin wetcake is easily achieved. An additional benefit of vaporization is that the vinyl resin particles in the agglomerates no longer have a tendency to stick to one another and thus break apart. The centrifugal force created in the dryer cavity causes larger particles to circulate about the outer perimeter and hence back to the grinding area of the mill where they are further broken apart. This circulation continues until the particles are fine enough so that they circulate about the inner perimeter of the mill and exit therefrom to a tank, product collector, storage bin or the like. A suitable fluid energy dryer is a Thermajet dryer manufactured by Aljet Equipment Company, Willow Grove, Penna. Although various size fluid energy dryers can be utilized, generally a dryer having a capacity of from about 500 lbs/hr. to about 30,000 lbs/hr. is utilized.

The drying process of the present invention results in a low cost high volume drying process. Energy consumption is also reduced as compared to a spray drying process. Moreover, no coagulation step is necessary thereby eliminating the need for coagulation additives and the subsequent removal thereof.

The dried particles from the fluid energy dryer can be collected in any manner and subsequently treated to form a plastisol. To form the plastisol, a liquid plasticizer is added thereto whereby the solid vinyl resin particles are suspended. The type of various plasticizers are well known to the art as well as to the literature. Examples of suitable plasticizers include the various phthalates, the various epoxides, the various aliphatic diesters, the various phosphates, the various polyesters, the various specialty plasticizers, and combinations of the above. Additionally, various extenders can also be added. Of the various plasticizers, the phthalate diesters are preferred such as the isomers of dioctyl phthalate. Since the various types of as well as specific plasticizers are numerous, reference is hereby made to *Plastisols & Organosols*, Chapter 3, "Plasticizers", by Miller and Wickson, edited by Sarvetnick, Van Norstrand Co., 1972, which is hereby fully incorporated by reference with regard to the various types, classes, individual plasticizers, and the like.

The amount of plasticizer can generally vary over a wide range depending upon the use of various fillers and other compounding ingredients well known to the art and to the literature. The amount of the plasticizer is generally from about 25 to about 300 parts and desirably from about 45 to about 100 parts by weight based upon 100 parts by weight of dry vinyl resin particles. Generally, the plastisol has an average particle size of from about 0.1 to about 20 microns, desirably from about 0.5 to about 2.5 microns and preferably from about 0.8 to about 2.0 microns.

The various resins made according to the present invention can be utilized in the preparation of plastisols, which are subsequently utilized in vinyl coating and molding applications, such as fabric coating, vinyl roll flooring, vinyl footwear, upholstery, and the like.

The invention will be better understood by reference to the following examples.

EXAMPLE 1

GEON ® 178 slurry, a medium molecular weight PVC having a low level of a fatty acid salt, at 40 percent solids content was fed to a lab electrofilter, manufactured by Dorr Oliver, Millileaf model, an electrically augmented vacuum filter on level control. The electrofilter anode provided 600 $cm^2$ of membrane surface for cake deposit. An electric field direct current was applied at 13.33 milliamps per $cm^2$ for six minutes, after which the wetcake was removed by doctor blades. Solids content of the wetcake was 81.4%. Throughout the process a 0.5M ammonium carbonate anolyte was circulated in the anode cavity. Conductivity was 50,000 micromhos per cm. Slurry conductivity was 1700 and the filtrate removed through the cathode filter bags showed a conductivity of 500. Wetcake weights averaged 1.7 pounds (1.38 pounds dry) for a productivity of 13.8 pounds dry resin per hour. A 20 inch Hg vacuum was maintained on the cathode producing 11.9 lbs. of filtrate per hour.

The PVC wetcake was dried to a fine powder in the pilot scale fluid energy dryer, a 3 inch Pulvajet, manufactured by AlJet Corp., Willow Grove, Pa. An air pressure of 5.2 PSIG was maintained at the nozzle intake chamber. The inlet temperature of the drying air was 100° C. Product at the dryer discharge was 49° C. Product was fed to the dryer at a rate of 166.2 lbs. wetcake/hr. (135.5 lbs. PVC/hr. and 30.7 lbs. water/hr.).

The dry PVC product has a level of methanol extractables of 1.1% and a water content of 0.1%. This resin was dispersed in a standard screening plastisol formulation containing 100 parts of resin, 57 parts of dioctyl phthalate, 3 parts of epoxidized soy oil, and 2 parts of barium/zinc stabilizer. The resulting plastisol had initial low shear viscosity of 13,400 centipoise at 2 rpm on a Brookfield RVF viscometer and 6,200 centipoise at 20 rpm. The viscosity of one day aged plastisol was 16,200 centipoise at 2 rpm and 7,800 centipoise at 20 rpm. The aged sample has a high shear flow rate of 20 grams per 100 sec. on a Severs viscometer at 95 PSIG. Films fused from the plastisol at 20 mil thickness and baked 5 minutes at 350° F. Exhibited a high clarity of 86% light transmittance and a good resistance to heat degradation whereby no color change was experienced after 20 minutes exposure at 375° F.

EXAMPLE 2

GEON® 121 slurry, a medium molecular weight PVC having a medium level of an alpha-olefin sulfonate salt, at 40% total solids was processed in the lab unit of Example 1 at a current density of 13.33 milliamps per cm$^2$ and a cycle time of six minutes. The product cake had a solids content of 79.2%. The electrolyte solution circulated through the anode was a 10% total solids solution of alkyl phenol polyether sulfate sodium salt with ammonium carbonate added to maintain pH at a minimum of 8.5, and conductivity at a minimum of 12,000 micromhos/cm. The slurry conductivity was 1,000 micromhos/cm and its pH was 9.5. Product cake was generated at a rate of 16.2 lbs./hr. (12.8 lbs. dry/hr.).

The wetcake was dried in the fluid energy dryer of Example 1 with inlet air conditions of 5.4 PSIG and 101° C. Discharge temperature was 51° C. and drying rate 128.3 lbs. PVC/hr. or 33.7 lbs. water removal per hour. Product moisture content was 0.1% and methanol extractables were 2.5%.

Standard screening plastisol, (Example 1) initial Brookfield viscosity, was 27,800 CPS at 2 rpm and 10,400 CPS at 20 rpm. At one day age viscosity was 30,400 CPS for 2 rpm and 12,900 CPS for 20 rpm.

Severs efflux was 16 grams per 100 sec. on the aged sample. Particle size was measured on the vinyl dispersion gauge as 40 microns. Films tested for heat stability at 375° F. reached dark point failure at 18 minutes.

EXAMPLE 3

GEON® 178 slurry at 42% total solids was processed in a lab unit as set forth in Example 1 at a current density of 6.67 milliamps/cm$^2$. Cake was produced with 79.6% total solids at a rate of 8 wet lbs./hr. or 6.37 lbs. dry/hr. using four minute cycles. Filtrate was removed at 7.8 lbs./hr under a 20 inch mercury vacuum. Anolyte was 0.5 Molar ammonium carbonate with a conductivity in excess of 35,000 micromhos/cm. Slurry conductivity was less than 1,700 micromhos/cm.

The cake was dried in the fluid energy dryer of Example 1 with 101° C. inlet termperature and 5.6 PSIG. Outlet temperature was 49° C. Product moisture content was 0.04% and methanol extractables were 1.1%.

Plastisol (Example 1) initial Brookfield viscosity was 18,000 CPS at 2 rpm and 8,000 CPS at 20 rpm. Day aged viscosity was 24,000 CPS at 2 rpm and 10,400 CPS at 20 rpm. Severs efflux was 24.8 grams/100 sec. and vinyl dispersion gauge particle size was 40 micron.

Film properties were 85% light transmittance and 22 min. at 375° F. before onset of color. 10 mil films fused 3 min. at 390° F. have a yellow index of 2.1 on the colormeter.

EXAMPLE 4

GEON® 124A slurry, a low molecular weight PVC containing a high level of an alkyl sulfate salt, at 35% total solids was fed to an electrofilter as described in Example 1 at 13.33 milliamps/cm$^2$ with 6 minute cycles. The wetcake total solids was 76.5%. Production rate was 19.15 lbs. wetcake/hr. The anolyte solution was 10% total solids alkyl phenol polyether sulfate sodium salt with ammonium carbonate. Conductivity of the anolyte was 14,500 micromhos/cm and the slurry was 840 micromhos/cm.

The cake was dried in the fluid energy dryer of Example 1 at 100° C. inlet, 49° C. outlet, and 5.9 PSIG.

Plastisol (Example 1) initial Brookfield viscosity was 22,000 CPS at 2 rpm and 8,600 CPS at 20 rpm. One day aged viscosity was 22,000 CPS and 10,000 CPS at 2 and 20 rpm, respectively. Severs efflux on the aged sample was 19.6 grams/100 sec. Films fused 5 minutes at 350° F. exhibited high gloss at 85% reflectance, good clarity at 76% transmittance, and good 375° F. heat stability at 17 min. exposure before initial color development.

EXAMPLE 5

GEON® 178 slurry with 38.5% total solids was processed in the electrofilter of Example 1 at a current density of 6.67 milliamps/cm$^2$ using 10 minute cycles. An 82% total solids cake was yielded at 7.52 lbs./hr. (wet). The anolyte was the same as Example 2. Slurry conductivity was 1,450 micromhos and pH was 9.4.

The cake was dried in a showering tray dryer. The outlet temperature was maintained at 110° F. Inlet temperature was varied throughout the drying cycle to maintain outlet. Minimal temperature drop was taken across the dryer. The batch required a 3 hour cycle to dry to less than 0.2% moisture. The dry cake was pulverized in a lab scale mechanical grinder.

A plastisol formulation (Example 1) was tested on a vinyl dispersion gauge and had a particle size of 40 microns. Initial Brookfield viscosity was 9,500 CPS at 2 rpm and 6,200 CPS at 20 rpm. After one day aging, viscosity was 10,200 CPS and 6,700 CPS at 2 and 20 rpm. Severs efflux was 25.9 grams/100 sec. Films had high gloss and clarity at 91% reflectance and 82% transmittance.

The various physical property values obtained in Examples 1 through 5 are similar to PVC resin properties obtained by a spray dryer of Example 8.

EXAMPLE 6

A typical PVC dispersion slurry containing 33% total solids was spray dried. Intake air was heated with steam from a gas-fired boiler. With a gas cost of 0.50 cents per cubic foot and a steam usage of 6.15 lbs. of steam per pound of PVC, the cost to dry a pound of PVC is 5.04 cents. Electrical energy is consumed at a rate of 0.213 kilowatt hours per pound of PVC. With electricity costing 6.0 cents per kilowatt hour, the drying cost for PVC is 1.28 cents per pound of PVC. This yields a total energy cost of 6.32 cents per pound of PVC.

EXAMPLE 7

Using the same PVC dispersion slurry as in Example 6 having a 33% solids content, an energy consumption evaluation was made on the lab scale electrofilter (Example 1), in combination with a fluid energy dryer. When operated with a current density of 6.66 milliamps/cm$^2$, electrical energy is consumed in the electrofilter at a rate of 0.35 kilowatt hours per pound of PVC processed and the PVC is delivered at a solids content of 80% to the fluid energy dryer. The dryer is operated with 5 PSIG inlet air heated with a direct-fired gas burner. Electrical consumption for the dryer is 0.079 kilowatt hour per pound of PVC. Gas is used at a rate of 0.58 cubic feet per pound of PVC. Utility costs are 6 cents per kilowatt hour and 0.5 cents per cubic foot of gas. Total energy cost for the electrofilter and fluid energy dryer is thus 0.975 cents per pound of PVC. Note that this is only 15% of the spray drying energy cost from Example 6.

EXAMPLE 8

GEON ® 124 slurry at 48.5% total solids and 1,000 micromhos/cm conductivity was processed in the lab scale electrofilter (Example 1). Current density was maintained at 13.33 milliamps per cm$^2$. A five minute time cycle was used and ten inches of mercury vacuum was held on both the anode and cathode. The product cake was 78% solids. A very simple electrolyte was chosen for use in the anolyte system, this being a 1 molar solution of sodium bicarbonate having a conductivity of 40,000 micromhos per cm. Cake was generated at a rate of 22.5 pounds dry PVC per hour.

Wetcake was dried in the fluid energy dryer with 5 PSIG inlet air at 100° C. and outlet air at 45° C.

Standard plastisol and film laboratory evaluations show particle size to be 30 micron maximum via vinyl dispersion gauge. Plastisol viscosity on a one day aged sample using a Brookfield viscometer at 2 rpm was 35,000 centipoise and at 20 rpm was 14,000 centipoise. Severs efflux rate was 16.6 grams per 100 sec. Films made from the plastisol exhibited very dark coloring and numerous small bubbles.

Similar spray dried product yielded 50 micron maximum particles, 2 rpm Brookfield viscosity was 17,000 centipoise and 20 rpm viscosity was 11,400 centipoise. Severs efflux values was 13.9 grams per 100 sec. Films were near water white and bubble free.

The presence of the bubbles in the films indicates that sodium bicarbonate from the anolyte was transported across the anode membrane and dispersed in the PVC cake. The sodium bicarbonate then decomposed during the process of fusing the vinyl films, resulting in trapped air bubbles.

Thus, it is apparent from the above examples that great energy cost savings are obtained as well as suitable vinyl plastisol films.

While the best mode of preferred embodiments have been set forth in accordance with the Patent Statutes, the scope of the invention is not limited thereby but rather by the scope of the attached claims.

What is claimed is:

1. A method of removing water from a dispersed particle slurry, comprising the steps of:
   adding the slurry to an electrofilter, said electrofilter being an electrically augmented vacumm filter, said electrically augmented vacuum filter having an anolyte, said anolyte having a conductivity of at least 5,000 micromhos/cm;
   removing a portion of the water from said slurry to partially dry said slurry and form a wetcake,
   adding said wetcake to a mechanical dryer, and drying said wetcake.

2. A method according to claim 1, wherein said dryer is a fluid energy dryer.

3. A method according to claim 2, including injecting a pressurized gas into said fluid energy dryer, said gas being at a pressure of from about 2.5 psig to about 80 psig and including emitting said pressurized gas from said fluid energy dryer at a temperature of from about 35° C. to about 100° C.

4. A method according to claim 3 wherein said dispersed particle is is a polymer of a vinyl halide or a vinylidene halide, or a copolymer of said vinyl halide and said vinylidene halide or an unsaturated olefin monomer.

5. A method according to claim 4, wherein said anolyte has a conductivity of at least 30,000 micromhos/cm, wherein said dryer outlet temperature is from about 45° C. to about 55° C., wherein said dispersed particle is polyvinylchloride.

6. A method according to claim 5, wherein said pressurized gas injected into said fluid energy dryer is at a pressure of from about 2.5 psig to about 7.5 psig.

7. A method according to claim 1, including a prefilter, and adding said slurry to said prefilter before adding said slurry to said electrofilter.

8. A method according to claim 4, including a prefilter, and adding said slurry to said prefilter before adding said slurry to said electrofilter, said prefilter being an ultrafilter containing a semipermeable membrane therein.

9. A method according to claim 5, including a prefilter, and adding said slurry to said prefilter before adding said slurry to said electrofilter, said prefilter being an ultrafilter containing a semipermeable membrane therein, said slurry added to said semipermeable membrane at a pressure of from about 10 psig to about 60 psig.

10. A process according to claim 6, including a prefilter, and adding said slurry to said prefilter before adding said slurry to said electrofilter, said prefilter being an ultrafilter containing a semipermeable membrane therein, said slurry added to said semipermeable membrane at a pressure of from about 20 psig to about 50 psig.

* * * * *